(12) United States Patent
Lin

(10) Patent No.: US 7,839,624 B2
(45) Date of Patent: Nov. 23, 2010

(54) INDUSTRIAL COMPUTER CHASSIS STRUCTURE WITH POWER SOURCE DISPOSED CENTRALLY

(75) Inventor: Te-Chang Lin, San Jose, CA (US)

(73) Assignee: Super Micro Computer Inc., San Jose, CA (US)

( * ) Notice: Subject to any disclaimer, the term of this patent is extended or adjusted under 35 U.S.C. 154(b) by 13 days.

(21) Appl. No.: 12/428,623

(22) Filed: Apr. 23, 2009

(65) Prior Publication Data
US 2010/0270897 A1 Oct. 28, 2010

(51) Int. Cl.
G06F 1/16 (2006.01)
(52) U.S. Cl. ................................. 361/679.02
(58) Field of Classification Search ............. 361/679.2, 361/679.02
See application file for complete search history.

(56) References Cited

U.S. PATENT DOCUMENTS

| | | | | | |
|---|---|---|---|---|---|
| 5,680,536 | A | * | 10/1997 | Tyuluman | 714/1 |
| 5,684,671 | A | * | 11/1997 | Hobbs et al. | 361/679.57 |
| 5,691,883 | A | * | 11/1997 | Nelson | 361/697 |
| 5,816,673 | A | * | 10/1998 | Sauer et al. | 312/223.2 |
| 6,031,717 | A | * | 2/2000 | Baddour et al. | 361/679.49 |
| 6,115,250 | A | * | 9/2000 | Schmitt | 361/695 |
| 6,574,100 | B1 | * | 6/2003 | Anderson | 361/679.5 |
| 6,657,867 | B2 | * | 12/2003 | Smith | 361/725 |
| 6,667,891 | B2 | * | 12/2003 | Coglitore et al. | 361/796 |
| 6,704,196 | B1 | * | 3/2004 | Rodriguez et al. | 361/679.33 |
| 7,333,330 | B2 | * | 2/2008 | McEwan | 361/679.48 |
| 2007/0035923 | A1 | * | 2/2007 | Beall et al. | 361/687 |
| 2008/0037209 | A1 | * | 2/2008 | Niazi et al. | 361/683 |
| 2008/0037214 | A1 | * | 2/2008 | Niazi et al. | 361/687 |

* cited by examiner

*Primary Examiner*—Lisa Lea-Edmonds
(74) *Attorney, Agent, or Firm*—Chun-Ming Shih; HDLS IPR Service

(57) ABSTRACT

An industrial computer chassis structure is mainly to partition at least two motherboard sections in the shell of the computer chassis, in each of which a motherboard tray capable of being pulled and drawn is arranged and is provided for placing a motherboard therein. Meanwhile, the two motherboard sections are horizontally disposed by being parallel with each other, in the space between which a power source arrangement section is formed. The power source arrangement section is provided for arranging power supplies of the computer therein. Through this kind of disposition structure, all motherboards in the motherboard sections can be close to the power source arrangement section as near as possible, such that a function of common usage can be achieved for both the hardware connection and the software system control.

5 Claims, 2 Drawing Sheets

INDUSTRIAL COMPUTER CHASSIS STRUCTURE WITH POWER SOURCE DISPOSED CENTRALLY

BACKGROUND OF THE INVENTION

1. Field of the Invention

The present invention in general relates to an industrial computer, in particular, to an industrial computer chassis structure which is applied to a server and has a power source disposed centrally.

2. Description of Prior Art

Since of a daily progress of computer industry and a daily reliance on industry computer system, the requirement asked by enterprises onto server system is also heightened relatively. Responding to the speedy growth, many enterprises usually adopt the integration of numerous servers. Thereby, the gigantically produced data or the very-busy internet interaction can be handled and the future requirement concerning the expansion and upgrade of the server system can also be responded.

In addition, common industrial computer is usually operated in a long period. Once a malfunction problem occurs to any hardware, enterprise usually requires that the hardware assembly has to be repaired or changed, under the condition that the server should not be shut down. Therefore, the hot-swappable motherboard is required and the system functions for inter-supporting power supply and cooling fan thereby emerge.

According to prior arts, their power supplies are not disposed at most appropriate position in the computer chassis. Therefore, when a malfunction problem occurs to one power supply, although the supplied watts of other power supplies can be raised, through the control of a software system, however, the difficulty to integrate the hardware in the chassis is raised due to the poor design of the disposition structure, the result even causing the increases of complexity and cost in terms of structural design.

Accordingly, after a substantially devoted study, in cooperation with the application of relative academic principles, the inventor has finally proposed the present invention that is designed reasonably to possess the capability to improve the drawback of the prior art significantly.

SUMMARY OF THE INVENTION

The invention is mainly to provide an industrial computer chassis structure with power source disposed centrally. By arranging power source in central position of the chassis shell and by disposing one motherboard respectively at two sides of the power source, each motherboard can be neighbored the power source, reaching the common use in either the hardware connection or software system control.

The invention is to provide an industrial computer chassis structure with power source disposed centrally. The invention has a chassis shell, in which two motherboard sections are partitioned, in each of which a motherboard tray capable of being pulled and drawn is arranged and is provided for a motherboard to be placed therein. Meanwhile, the two motherboard sections are horizontally disposed by being parallel with each other, in the space between which a power source arrangement section is formed. The power source arrangement section is provided for arranging power supplies of the computer therein. Through this kind of disposition structure, all motherboards in the motherboard sections can be close to the power source arrangement section as near as possible, such that a function of common usage can be achieved for both the hardware connection and the software system control.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

In cooperation with attached drawings, the technical contents and detailed description of the present invention are described thereinafter according to a preferable embodiment, not used to limit its executing scope. Any equivalent variation and modification made according to appended claims is all covered by the claims claimed by the present invention.

Figure 1:
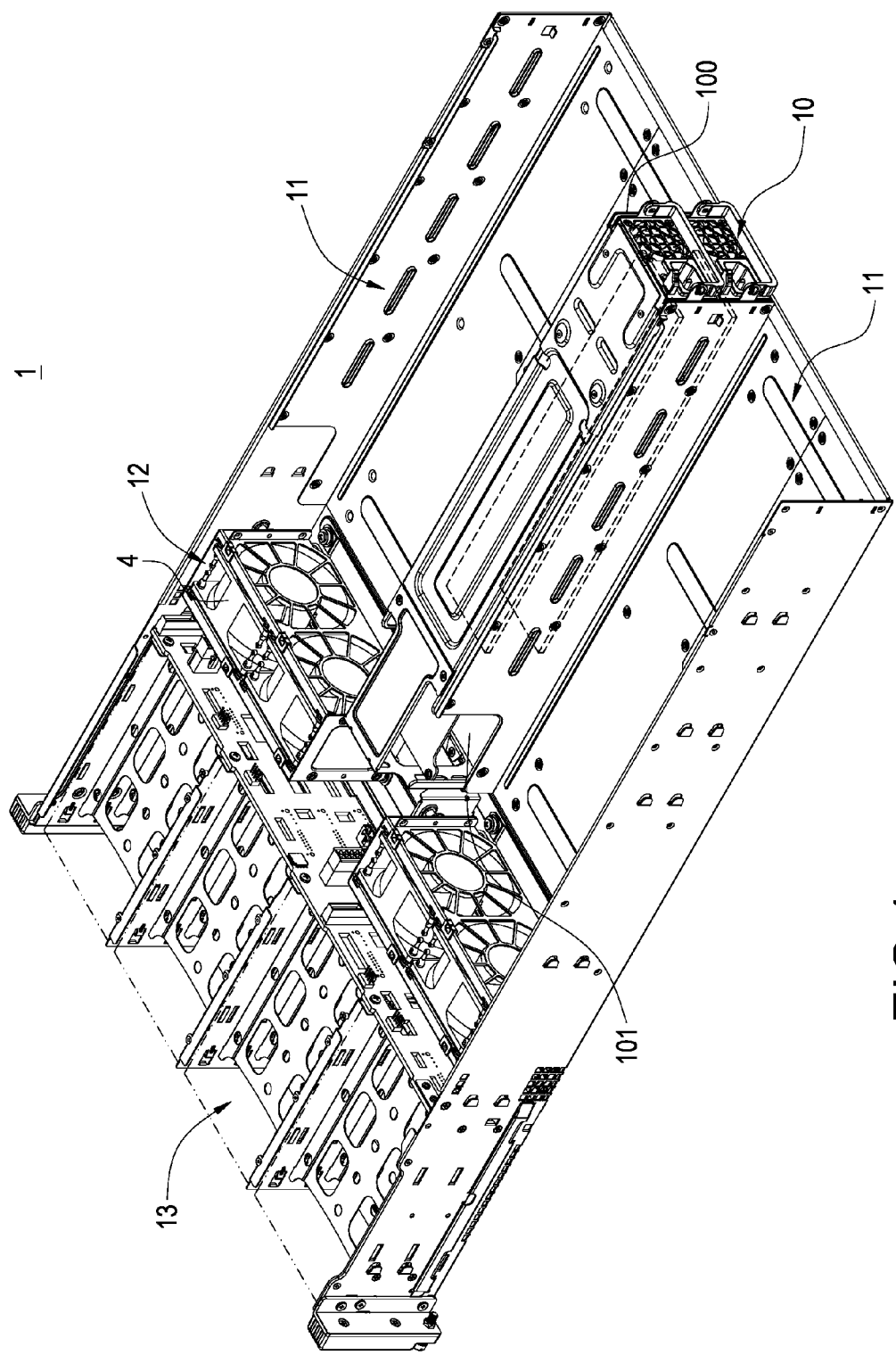
FIG. 1 is a perspective view of the internal structure of the present invention.
Figure 2:
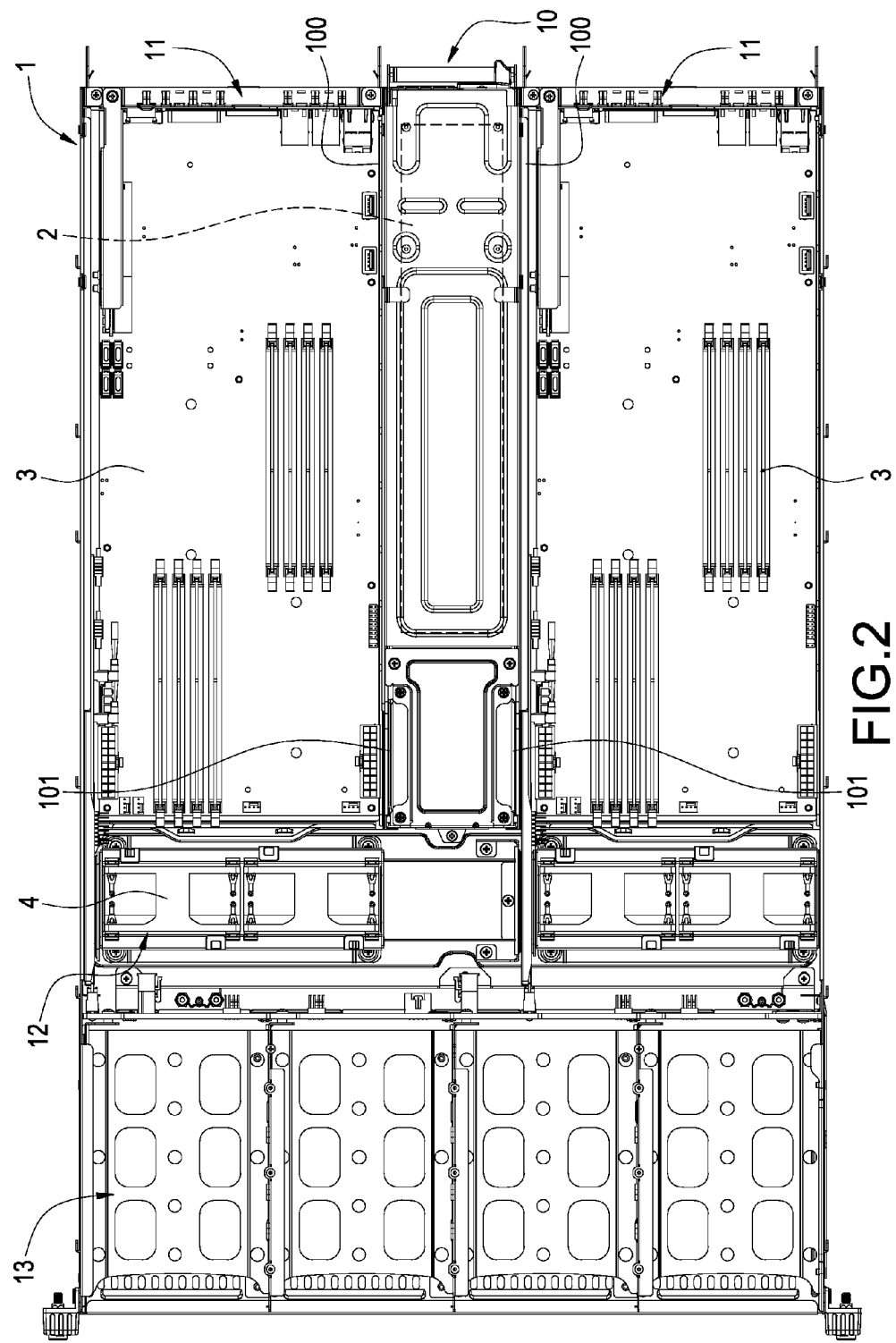
FIG. 2 is a top plane illustration of the present invention.

Please refer to FIG. 1 and FIG. 2, respectively showing a perspective view of an internal structure of the invention and a top plane illustration of the invention. The invention is to provide an industrial computer chassis structure with power source disposed centrally, having a chassis shell 1 of industrial computer, at least one power source arrangement section 10 partitioned in the chassis shell 1 and at least two motherboard sections 11 respectively located at two sides of the power source arrangement section 10, whereby aforementioned each motherboard section 11 can be close to the power source arrangement section 10 as near as possible, further facilitating a common use of power source for the connection of hardware and the control of software system.

In the embodiment proposed by the invention, the chassis shell 1 is to arrange the motherboard section 11 respectively at two sides of its front half part. The power source arrangement section 10 is located in the space between the two motherboard sections 11. The space is formed by two partitioning walls 100, which are uprightly arranged. Thereby, it facilitates the power source arrangement section 10 and the motherboard section 11 respectively in arranging power supplies 2 and motherboards 3. In addition, in the other partitions of chassis shell 1, there are a fan section 12 and a storage unit section 13. The storage unit section 13 is located at the rear half part of the chassis shell 1, while the fan section 12 is located between the motherboard section 11 and the storage unit section 13. The fan section 12 is provided for disposing fans 4 therein. The fans 4 can blow cool air onto each motherboard 3 to provide a cooling effect. The storage unit section 13 is provided for arranging storage units therein, like, hard discs (not shown), which will provide the function of storing data needed by the server system. Through the constitution of aforementioned parts, the structure of the chassis shell 1 according to one preferred embodiment proposed by the invention is thus obtained.

Following aforementioned description, the two motherboard sections 11 are horizontally arranged by being parallel with each other, in each of which a motherboard tray capable of being pulled and drawn is arranged for the motherboard 3 to be placed therein. On the partitioning wall 100, there is wire-rounding gap 101 provided for the wires (not shown) to pass through. Via the wires, the motherboard 3 can be electrically connected from the motherboard section 11 to the power source arrangement section 10. In the meantime, the wire-rounding gap 101 is located at one side of the partitioning wall 100 adjacent to the fan section 12 and the storage unit section 13, such that it facilitates an electric connection between these hardware assemblies and the power source.

In addition, the power supply 2 arranged in the power source arrangement section 10 can be of a plurality, which therefore commonly provide the power needed by the motherboard 3 and other each hardware component. When a malfunction problem occurs to any power supply, through a control of the software system, other normally operating power supplies can heighten their supplying watts. In this case, the power originally supplied by the malfunctioned power supply can be thereby made up, so the entire operation of the server can be continued normally. Therefore, through the disposing structure of the present invention, it facilitates the adjacent connection between the power supplies and the motherboard or the other each hardware component. Thereby, a function of common usage can be achieved no matter in hardware connection or software system control.

Accordingly, through the constitution of aforementioned assemblies, a disposing structure for the power source in an industrial computer chassis according to the invention is thus obtained.

Summarizing aforementioned description, the disposing structure according to the invention is an indispensably design for industrial computer chassis indeed, which may positively reach the expected usage objective for solving the drawbacks of the prior arts, and which extremely possesses the innovation and progressiveness to completely fulfill the applying merits of new type patent, according to which the invention is thereby applied. Please examine the application carefully and grant it as a formal patent for protecting the rights of the inventor.

However, the aforementioned description is only a preferable embodiment according to the present invention, not used to limit the patent scope of the invention, so equivalently structural variation made to the contents of the present invention, for example, description and drawings, is all covered by the claims claimed thereinafter.

What is claimed is:

1. An industrial computer chassis structure comprising:
   a chassis shell, in which two motherboard sections are partitioned to be located respectively adjacent two lateral sides of a front part thereof and a power source arrangement section is formed between the two motherboard sections;
   a power supply of a computer installed in the power source arrangement section,
   thereby, through this kind of disposition structure, two motherboards to be installed respectively in the motherboard sections can be close to the power source arrangement section as near as possible, such that a function of common usage can be achieved for both a hardware connection and a software system control.

2. The industrial computer chassis structure with power source disposed centrally according to claim 1, wherein a rear part of the chassis shell is further partitioned into a storage unit section and a fan section is further partitioned between the two motherboard sections and the storage unit section.

3. The industrial computer chassis structure with power source disposed centrally according to claim 2, wherein the power source arrangement section is formed by arranging partitioning walls uprightly at its two sides and a wire-rounding gap is provided at each partitioning wall for a wire to pass through.

4. The industrial computer chassis structure with power source disposed centrally according to claim 3, wherein the wire-rounding gap is located at one side of the partitioning wall adjacent to the fan section and the storage unit section.

5. The industrial computer chassis structure with power source disposed centrally according to claim 1, wherein the power source arrangement section is formed by arranging partitioning walls uprightly at its two sides and a wire-rounding gap is provided at each partitioning wall for a wire to pass through.

* * * * *